(12) United States Patent
Hashimoto et al.

(10) Patent No.: US 7,539,817 B2
(45) Date of Patent: May 26, 2009

(54) STORAGE SYSTEM AND CAPACITY ALLOCATION METHOD THEREFOR

(75) Inventors: Akiyoshi Hashimoto, Kawasaki (JP); Yasutomo Yamamoto, Sagamihara (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 294 days.

(21) Appl. No.: 11/350,679

(22) Filed: Feb. 8, 2006

(65) Prior Publication Data
US 2007/0130424 A1 Jun. 7, 2007

(30) Foreign Application Priority Data
Dec. 2, 2005 (JP) ............................. 2005-348690

(51) Int. Cl.
*G06F 12/00* (2006.01)
(52) U.S. Cl. .................. 711/114; 711/170; 713/324
(58) Field of Classification Search .................. 711/114, 711/170; 713/324
See application file for complete search history.

(56) References Cited

U.S. PATENT DOCUMENTS

| | | | |
|---|---|---|---|
| 5,900,007 A * | 5/1999 | Nunnelley et al. ............. | 711/4 |
| 2002/0019908 A1* | 2/2002 | Reuter et al. ................ | 711/112 |
| 2004/0054939 A1 | 3/2004 | Guha et al. | |
| 2005/0055601 A1 | 3/2005 | Wilson et al. | |
| 2007/0143542 A1* | 6/2007 | Watanabe et al. ........... | 711/114 |

FOREIGN PATENT DOCUMENTS

| | | |
|---|---|---|
| JP | 08-190762 | 7/1996 |
| JP | 2000-293314 | 10/2000 |
| JP | 2002-312689 A | 10/2002 |

* cited by examiner

*Primary Examiner*—Brian R Peugh
*Assistant Examiner*—Jared I Rutz
(74) *Attorney, Agent, or Firm*—Townsend and Townsend and Crew LLP

(57) ABSTRACT

A storage system connected to a terminal, the computer system includes: a plurality of drive devices that respectively drive a plurality of physical disks each having a physical storage area; a RAID configuration unit that configures a plurality of RAID groups by grouping two or more of the plurality of physical disks; a logical disk creation unit that creates, for the terminal through the RAID group, a logical disk having a logical storage area associated with the physical storage area; a memory for storing a RAID group control table showing, for each the RAID group, (i) a free capacity that is the amount of physical storage area remaining in the RAID group to be able to be associated with the logical disk and (ii) a power status of the RAID group; a receiver that receives a request for creating a new logical disk; and an area allocation unit that allocates to the new logical disk the physical storage area remaining in the RAID group selected by giving priority to a RAID group in a powered state over a RAID group in a non-powered state with reference to the RAID group control table.

12 Claims, 15 Drawing Sheets

Fig.2

| RAID GROUP NUMBER | RAID LEVEL | START TRACK NUMBER | TOTAL CAPACITY | FREE CAPACITY | POWER STATUS | RUNNING STATUS |
|---|---|---|---|---|---|---|
| 0x00000000 | RAID5 | 0x00000000 | 0xf0000 | 0xd0000 | ON | NORMAL |
| 0x00000001 | RAID5 | 0x000f0000 | 0xf0000 | 0xd0000 | ON | NORMAL |
| 0x00000002 | RAID5 | 0x001e0000 | 0xf0000 | 0xe8000 | ON | NORMAL |
| ... | ... | ... | ... | ... | ... | ... |

Fig.3

| RAID GROUP NUMBER 300 | PHYSICAL DISK NUMBER 301 | CAPACITY PER TRACK 302 | TOTAL NUMBER OF TRACKS 303 | POWER STATUS 304 | RUNNING STATUS 305 |
|---|---|---|---|---|---|
| 0x00000000 | 0x00000000 | 256KB | 0x50000 | ON | NORMAL |
| | 0x00000001 | 256KB | 0x50000 | ON | NORMAL |
| | 0x00000002 | 256KB | 0x50000 | ON | NORMAL |
| | 0x00000003 | 256KB | 0x50000 | ON | NORMAL |
| 0x00000001 | 0x00000004 | ... | ... | ... | ... |

| LOGICAL DISK NUMBER | RAID GROUP NUMBER | LOGICAL TRACK NUMBER | START TRACK NUMBER | TOTAL CAPACITY | TOTAL TRACK NUMBER |
|---|---|---|---|---|---|
| 0x00000000 | 0x00000000 | 0x00000000 | 0x00000000 | 16GB | 0x00010000 |
| 0x00000001 | 0x00000000 | 0x00000000 | 0x00010000 | 16GB | 0x00010000 |
| 0x00000002 | 0x00000000 | 0x00000000 | 0x00020000 | 8GB | 0x00008000 |
| | 0x00000001 | 0x00008000 | 0x00028000 | 8GB | 0x00008000 |
| ••• | ••• | | ••• | ••• | ••• |

Fig.5

| USER IDENTIFIER 500 | LOGICAL DISK NUMBER IN USE 501 | CAPACITY 502 | TOTAL CAPACITY 503 |
|---|---|---|---|
| 0x0000 | 0x00000000 | 16GB | 32GB |
| | 0x00000001 | 16GB | |
| 0x0001 | 0x00000002 | 16GB | 16GB |
| ... | ... | ... | ... |

Fig.14

| LOGICAL DISK NUMBER | RAID GROUP NUMBER | LOGICAL TRACK NUMBER | START TRACK NUMBER | TOTAL CAPACITY | TOTAL TRACK NUMBER | NUMBER OF ALLOCATED TRACKS |
|---|---|---|---|---|---|---|
| 1400 | 1401 | 1402 | 1403 | 1404 | 1405 | 1406 |
| 0x00000000 | 0x00000000 | 0x00000000 | 0x00000000 | 16GB | 0x00010000 | 0x00002000 |
| 0x00000001 | 0x00000000 | 0x00000000 | 0x00010000 | 16GB | 0x00010000 | 0x00000000 |
| 0x00000002 | 0x00000000 | 0x00000000 | 0x00020000 | 8GB | 0x00008000 | 0x00004000 |
|  | 0x00000001 | 0x00008000 | 0x00028000 | 8GB | 0x00008000 | 0x00000000 |
| ... | ... | | | ... | ... | |

1407, 1408, 1409, 1410 point to rows in the "NUMBER OF ALLOCATED TRACKS" column.

| USER IDENTIFIER 1500 | LOGICAL DISK NUMBER IN USE 1501 | CAPACITY 1502 | TOTAL CAPACITY 1503 | SUBSTANTIALLY ALLOCATED CAPACITY 1504 |
|---|---|---|---|---|
| 0x0000 | 0x00000000 | 16GB | 32GB | 2GB |
| | 0x00000001 | 16GB | | 0GB |
| 0x0001 | 0x00000002 | 16GB | 16GB | 4GB |
| ... | ... | ... | ... | ... |

STORAGE SYSTEM AND CAPACITY ALLOCATION METHOD THEREFOR

CROSS-REFERENCES TO RELATED APPLICATION

This application relates to and claims priority from Japanese Patent Application No. P2005-348690, filed on Dec. 2, 2005, the entire disclosure of which is incorporated herein by reference.

BACKGROUND

1. Technical Field

The present invention relates to a computer system, and more particularly, to a control method for reducing the amount of power consumed by such device by managing the storage capacity thereof.

2. Related Art

In recent years, as information technology has advanced, the amount of information used by companies, government agencies and individuals has increased dramatically. This trend has led to a demand for storage systems with much higher storage capacities.

At present, storage systems with a plurality of hard disk drives installed therein are used as storage systems to store such information, but because these hard disk drives consume a large amount of electricity, demand continues to exist for hard disk drives that consume less power.

Accordingly, a technology that partially shuts off power to hard disk drives that are not being used by the storage system has been investigated as one method by which to reduce power consumption (see JP-A-8-190762 (Patent Document 1), for example).

Furthermore, there are situations in which the original storage capacity of the storage system bought by the user is insufficient, and additional hard disk drives must be purchased. To address this situation, an on-demand service has been developed in which extra hard disk drives are included in a storage system and the user is charged for only the storage capacity used (see JP-A-2002-190762 (Patent Document 2), for example). In Patent Document 2, a technology is disclosed in which, in order to achieve a rapid increase in storage capacity, the provider of the on-demand service (i) installs and delivers to the customer both hard disk drives actually purchased by the customer and hard disk drives that were not purchased by the customer, and (ii) when the customer executes a contract to increase the storage capacity, assigns one or more of the non-purchased disk drives for use by the customer.

Incidentally, according to Patent Document 1, the power supply to hard disks that are not being used by the customer is cut off. When the customer executes a contract to increase the storage capacity, power is connected to the hard disk drives to which the power had been cut off. Here, in Patent Document 2, when additional storage capacity is to be allocated to the user, one or more logical disks are created from the previously non-powered physical disks and are assigned to the user.

SUMMARY

In the technologies described in Patent Documents 1 and 2, where the storage capacity allocated to the user is increased, the amount of power consumption increases in tandem with the expansion in storage capacity, but insufficient attention has been paid to reducing this power consumption.

An advantage of some aspects of the invention realizes a storage system that employs 'storage on demand' technology and can limit power consumption to such as the minimum necessary amount.

A storage system according to an aspect of the invention has hard disk drives that each drives a hard disk comprising a physical disk, and when a logical disk comprising a logical storage area is created via association with one of these physical disks, a physical disk that is in a powered state is allocated to the new logical disk with a higher priority than a physical disk in a non-powered state.

Because powered disks are given priority in allocation to logical disks, an increase in the power consumption of the storage system that implements an on-demand service can be minimized.

BRIEF DESCRIPTION OF THE DRAWINGS

The invention will be described with reference to the accompanying drawings, wherein like numbers reference like elements.

FIG. 2 is an explanatory drawing of a RAID group control table 110 of a storage system 101.

FIG. 3 is an explanatory drawing of a physical disk control table 111 of the storage system 101.

FIG. 4 is an explanatory drawing of a logical disk control table 112 of the storage system 101.

FIG. 5 is an explanatory drawing of a user management table 113 of the storage system 101.

FIG. 14 is an explanatory drawing of a logical disk control table 1300.

FIG. 15 is an explanatory drawing of a user management table 1301.

DESCRIPTION OF THE PREFERRED EMBODIMENTS

Embodiments of the invention are described below with reference to the drawings. In this Specification, '0x' at the beginning of a text string indicates that it is a hexadecimal value: '0x12', for example, indicates the value of '18' expressed in the decimal system.

First Embodiment

Figure 1:
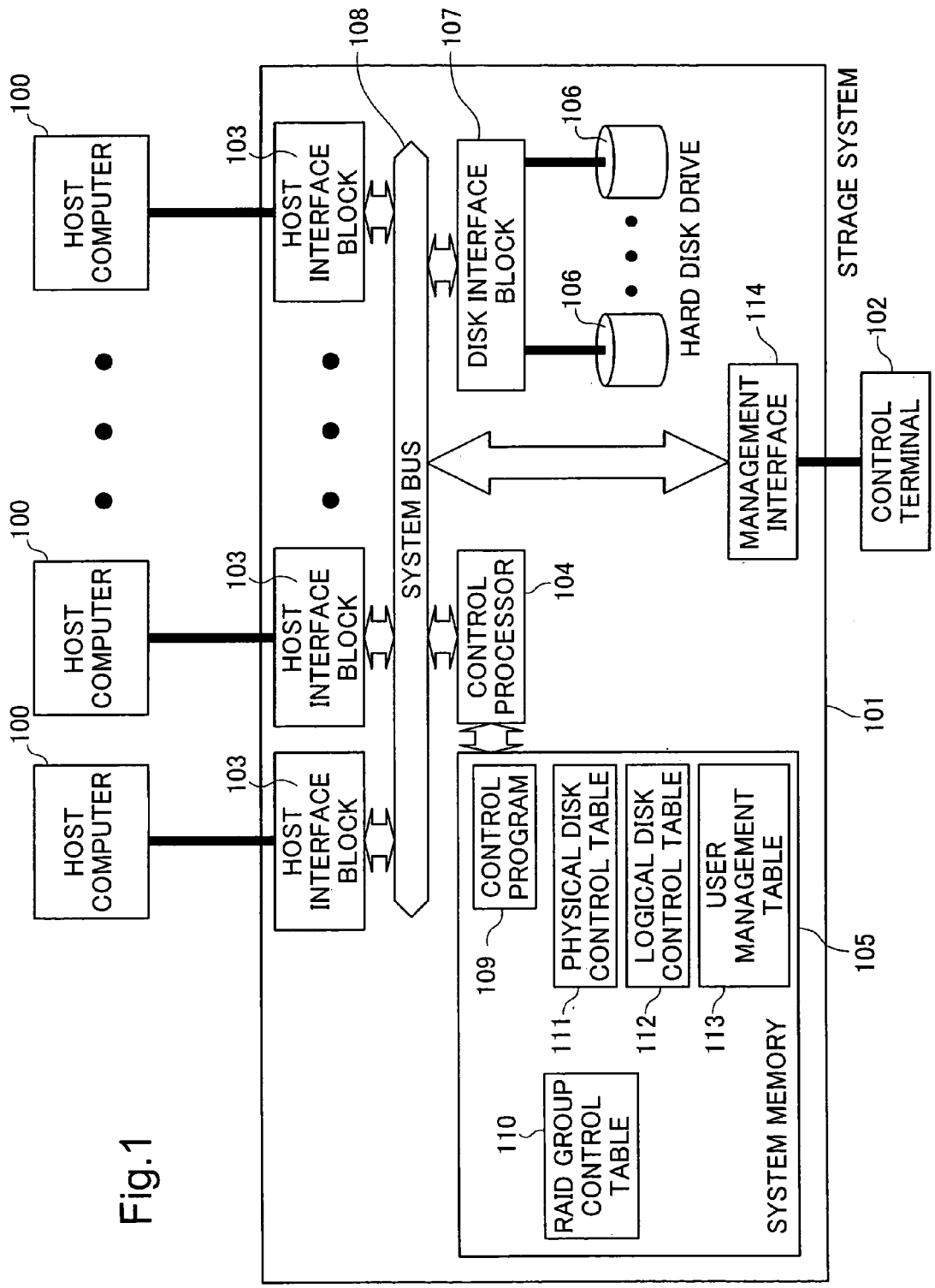
FIG. 1 is a block diagram showing the hardware configuration of a computer system.

FIG. 1 is a block diagram showing the hardware configuration of a computer system of a first embodiment. This computer system comprises a plurality of host computers 100, a storage system 101 and a control terminal 102 used by an administrator to operate the storage system 101. The storage system 101 comprises a plurality of host interfaces block 103 that controls communication with the host computer 100, a management interface 114 that controls communication with the control terminal 102, a control processor 104 that controls the storage system as a whole, a system memory 105 that stores control programs executed by the control processor 104 to control the storage system, hard disk drives 106 that store data, a disk interface block 107 that carries out control of the hard disk drives 106 and communication with the hard disk drives 106, and a system bus 108 that connects the host interface block 103, control processor 104, disk interface block 107 and management interface 114 one another.

Each hard disk drive 106 is managed in units of storage areas having a certain fixed size. That is, a control program 109 recognizes a hard disk drive 106 as a collection of units of this fixed size. These fixed-size units are termed 'tracks' in this Specification. In this example described in connection with this embodiment, one track has a size of 256 KB. Furthermore, the storage system of this embodiment is configured such that it may employ RAID technology.

Various control information used by the control processor 104 is stored in the system memory 105. The control program 109 is a program executed by the control processor 104. The control processor 104 controls the storage system 101 by executing a control program 110. The control program 110 is normally stored in a non-volatile medium (not shown) such as a flash memory. The control program 110 is transferred to the system memory 105 immediately after the power to the storage system 101 is turned ON and executed by the control processor 104. The control program 110 may alternatively be stored on a hard disk drive 106 instead of in the non-volatile memory described above. The control information used by the control processor 104 (synonymous with the control program 109) includes a RAID group control table 110 that stores RAID group information possessed by the storage system 101, a physical disk control table 111 that contains information pertaining to individual hard disk drives 106 (identical to physical disks), a logical disk control table 112 that contains information pertaining to the logical disks (not shown) used by the host computer 100, and a user management table 113 that contains information pertaining to the logical disks allocated to individual users.

The above control program includes a RAID configuration module that configures at least one RAID group comprising two or more of the above-described physical volumes that are grouped using RAID technology, a power switching module that switches the power supply to the various hard disk drives between a powered and non-powered state, a logical disk creation module that creates a logical disk associated with a prescribed unit of a physical disk, and an area allocation module that, when a new logical disk is to be created, gives priority in selection and allocation to this new logical disk to a physical disk that is in a powered state over a physical disk that is in a non-powered state. These function modules are realized via execution by the control processor. The above function modules may be provided via software as described above or via hardware such as a CPU or other LSI, or may be realized via a combination of hardware and software.

In this embodiment, a host computer 100 is a computer that includes, in addition to a CPU, ROM, RAM, HDD and the like, such hardware as an interface by which information is exchanged with the user of a host computer 100 and an interface by which data is exchanged with the storage system 101. An OS and various application programs are installed on each host computer 100. Communication between the storage system 101 and a host computer 100 may be carried out using any of the methods of SCSI (Small Computer System Interface) incorporating Fibre Channel standards, iSCSI, Gigabit Ethernet, Mainframe Serial Channel or Mainframe Fibre Channel.

The control terminal 102 of this embodiment is a computer that includes, in addition to a CPU, ROM, RAM, HDD and the like, such hardware as an interface by which information is exchanged with the administrator of the storage system 101 and an interface by which data is exchanged with the storage system 101. An OS and various application programs are installed on the control terminal 102.

In this embodiment, a storage system 101 having one control processor 104 is used as an example, but a plurality of control processors 104 may be used. In this case, the information in the system memory 105 is located on a storage medium that can be referenced and modified by any of the plurality of control processors 104.

The RAID group control table 110 will now be described using FIG. 2. FIG. 2 is an explanatory drawing of the RAID group control table 110.

A RAID group is a collection of a plurality of hard disk drives 106. The control processor 104 distributes and stores data within the RAID group. For example, in the case of RAID-5, a hard disk drive 106 that stores parity information exists within the RAID group, while in the case of RAID-1, the same data is stored on two different hard disk drives 106 in the RAID group. The RAID group number column 200 is a column that stores the identifier of each RAID group. The RAID level column 201 is a column that stores the RAID level of each RAID group. The start track number column 202 stores the smallest track number value for each of the hard disk drives 106 belonging to a RAID group.

The control processor 104 treats the hard disk drives 106 as collections of tracks, as described above. Each track on a hard disk drive 106 is assigned a unique identifier.

In this embodiment, an example will be described in which the track numbers of the hard disk drives 106 belonging to the same RAID group are continuous. However, this embodiment may naturally be utilized even in a case where the track numbers of the hard disk drives 106 belonging to the same RAID group are not continuous.

The total capacity column 203 is a column that stores the capacity of each RAID group in units of track. Here, where the RAID group has a RAID-5 or a RAID-1 configuration, the total area of the hard disk drives 106 is not necessarily available to the user. Therefore, the total capacity available to the user is recorded in the total capacity column 203. The free capacity column 204 is a column that, where a logical disk has been created from an individual RAID group, stores the free usable capacity of the logical disk in terms of the number of tracks.

The power status column 205 is a column that stores the power status of each RAID group. The powering ON or OFF of hard disk drives 106 is carried out globally for each RAID group. The running status column 206 stores the running status of each RAID group. The running status indicates whether the RAID group is operating normally or a failure has occurred. Here, a failure state means that a hard disk drive 106 has not issued a response to a command from the control program 109 or that a failure detection circuit (not shown) installed in a hard disk drive 106 has detected a failure and reported the failure to the control program 109.

The row 207 of the RAID group control table 110 stores the RAID group information for the RAID group number 0x00000000. In the discussion below, this RAID group will be abbreviated as 'RAID group 0x00000000'. The RAID level of the RAID group 0x00000000 is RAID-5, and the start track number is 0x00000000. Furthermore, the total capacity is 0xf0000, and the free capacity is 0xd0000. The power status is ON, indicating that the RAID group is in a powered state. The running status is NORMAL, indicating that the RAID group is operating normally. The same situation is indicated in rows 208, 209.

FIG. 3 shows the physical disk control table 111. The control processor 104 writes to the physical disk control table 111 information regarding each individual physical disk (hard disk drive 106). The RAID group number column 300 indicates the RAID group number that corresponds to a RAID group number shown in the column 200 of FIG. 2 above and to which a given hard disk drive 106 belongs. The physical disk number column 301 is a column used by the control processor 104 to indicate the identifier allocated to each individual physical disk (hard disk drive 106). The track capacity column 302 is a column used by the control processor 104 to indicate the capacity per track of each individual hard disk drive 106.

The total tracks column 303 is a column used by the control processor 104 to indicate the total number of tracks included in a given hard disk drive 106. When evaluated together with the track capacity column, the capacity of a hard disk drive 106 can be determined based on the number of tracks. The power status column 304 is a column used by the control processor 104 to indicate the power status of each individual hard disk drive 106. The running status column 305 is a column used by the control processor 104 to indicate the running status of each individual hard disk drive 106.

The row 306 indicates information regarding the physical disk having a physical disk number 0x00000000. This physical disk will be referred to as 'physical disk 0x00000000' below. Its track capacity is 256 KB, and its total number of tracks is 0x50000. Its power status is 'ON', indicating that the physical disk is in a powered state. Its running status is 'NORMAL', indicating that the physical disk is operating normally. The same is true for rows 307-310.

FIG. 4 is an explanatory drawing of the logical disk control table 112. A logical disk is a collection of tracks extracted by the control processor 104 from one or more hard disk drives 106. The control processor 104 responds to the host computers' 100 I/O (Input/Output) commands as if this collection of tracks were a single disk. For example, a logical disk is equivalent to an LU (logical unit) in SCSI terminology. The logical disk number column 400 is a column used by the control processor 104 to indicate the identifier allocated to each individual logical disk. The RAID group number column 401 is a column that indicates the identifier for each RAID group comprising the tracks extracted when the control processor 104 creates a given logical disk. The logical track number column 402 indicates the track number of each logical disk, and the start track number column 403 indicates the number of the physical first track of the actually allocated area within the RAID group. The control processor 104 can manage the association between a logical disk and the tracks on the physical disks via the logical disk number and start track number. The total capacity column 404 contains the capacities set by the control processor 104 for each individual logical disk. The total tracks column 405 expresses the capacity of each individual logical disk in terms of the number of tracks. Line 406 shows the information pertaining to a logical disk to which the logical disk number 0x00000000 is allocated (hereinafter referred to as the 'logical disk 0x00000000'). The logical disk 0x00000000 is created using the tracks of the RAID group 0x00000000, and has a logical disk number of 0x00000000, a start track number of 0x00000000, a total capacity of 16 GB, and 0x00010000 total tracks, as shown in line 406. In other words, it is shown that the control processor 104 allocated the tracks from track number 0x00000000 to track number 0x00010000 to the area of the logical disk 0x00000000 beginning with track number 0x00000000. The same situation is shown in lines 407-409. The logical disk 0x00000002 shown in rows 408 and 409 comprises tracks extracted from two different RAID groups. In other words, a logical disk can comprise tracks from a plurality of RAID groups.

FIG. 5 is an explanatory drawing of the user management table 113. The user identifier column 400 is a column in which the control processor 104 registers the identifier for the user to which each logical disk is allocated. In general, the user uses a host computer 100 and the host computer 100 uses a logical disk or disks. Therefore, the user identifier is synonymous with the identifier of the host computer 100. In this embodiment, the identifier of the host computer 100 is employed as the user identifier. The identifier of the host computer 100 may comprise a WWN (World-Wide Name) under the Fibre Channel standard, a MAC (Media Access Control) address under the IEEE 802.3 standard or the like, but any identifier that can specify a host computer may be used. The logical disk number in use column 501 is a column in which the control processor 104 registers the number of each logical disk allocated to a user (here, a host computer). The capacity column 502 is a column in which the control processor 104 registers the capacities of the respective logical disks. The total capacity column 503 is a column in which the control processor 104 registers the total capacity of the logical disks allocated to a user (here, a host computer).

For example, row 504 shows that the logical disks 0x00000000 and 0x00000000 are allocated to the host computer having the identifier 0x0000, the capacity of the logical disk 0x00000000 is 16 GB, the capacity of the logical disk 0x00000001 is 16 GB, and the total capacity is 32 GB. Row 505 shows the situation regarding the logical disk allocated to the host computer having the identifier 0x0001.

Figure 6:
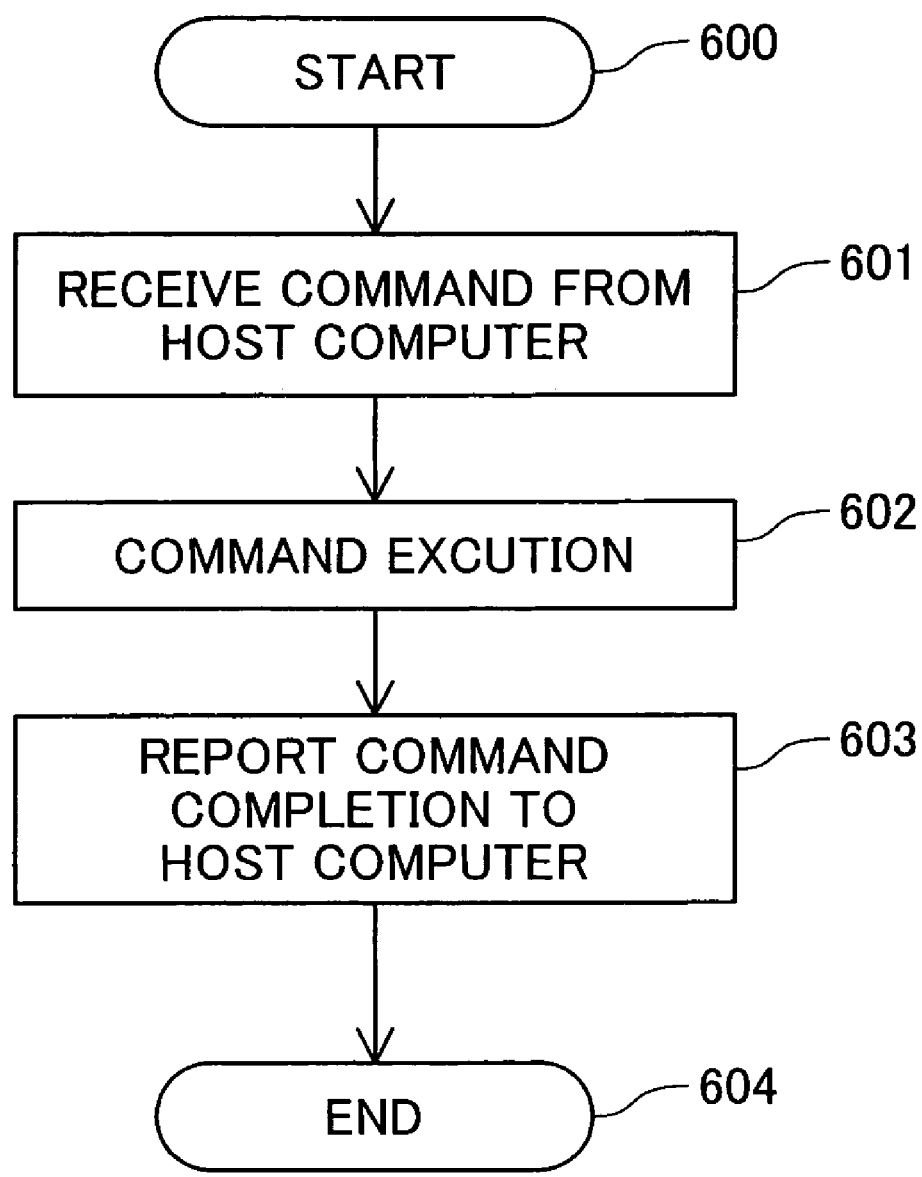
FIG. 6 is a flow chart showing the disk I/O command processing executed on the storage system 101.

FIG. 6 shows a flow chart of the sequence of operations executed when a host computer 100 issues an I/O command to the storage system 101. The storage system 101 receives the I/O command issued by the host computer 100 (step 601) and executes the command (step 602). Once the command is executed, the storage system 101 reports the result of the command's execution to the host computer 100 (step 603) and ends processing.

Figure 7:
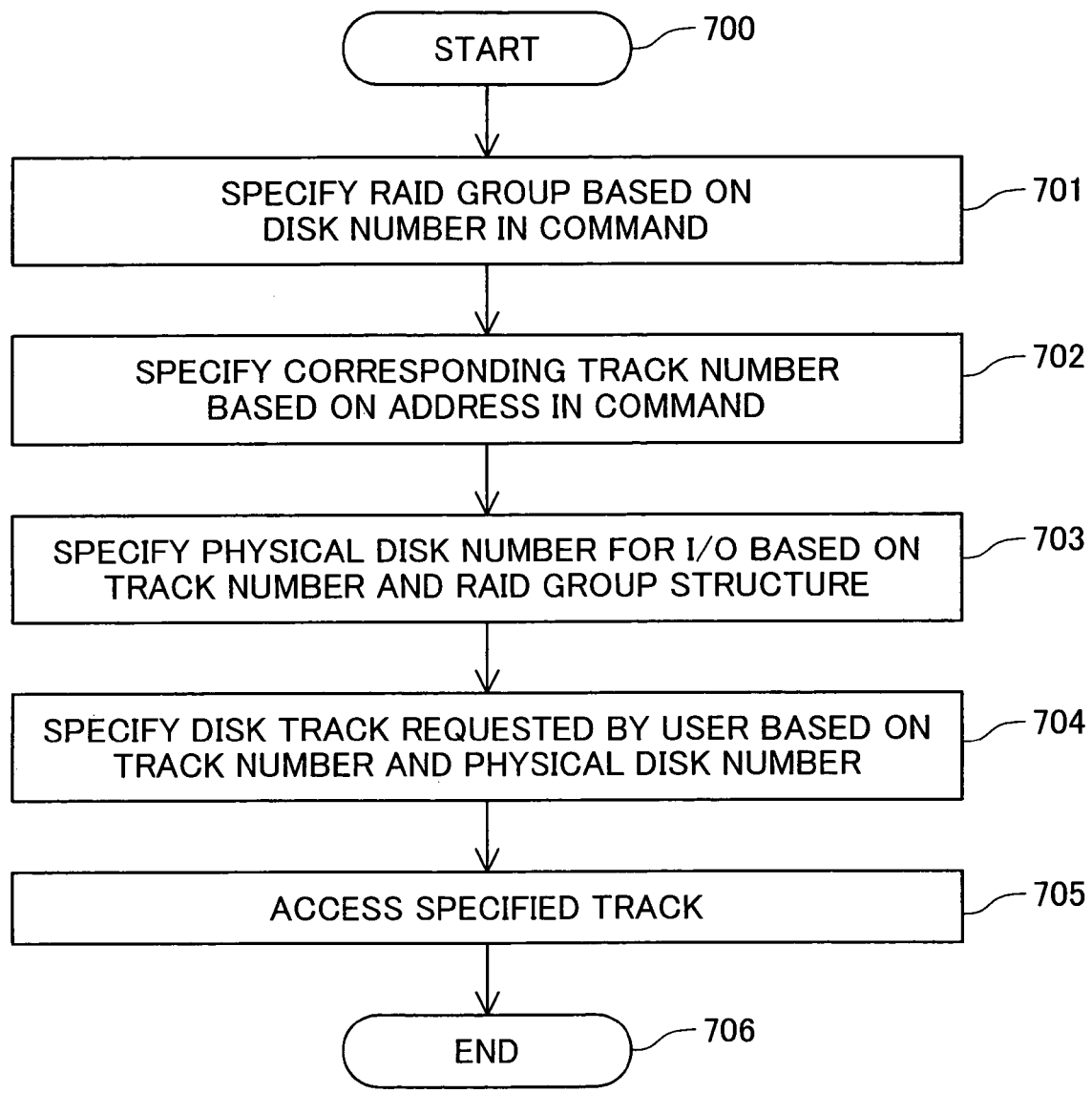
FIG. 7 is a flow chart showing the processing executed when a read or write command is received by the storage system 101.

FIG. 7 is a flow chart of the processing executed when a read or write command is issued by a host computer 100 to the storage system 101. The control processor 104 of the storage system 101 extracts the number of the logical disk comprising the target of the command from the received I/O command.

Figure 17:
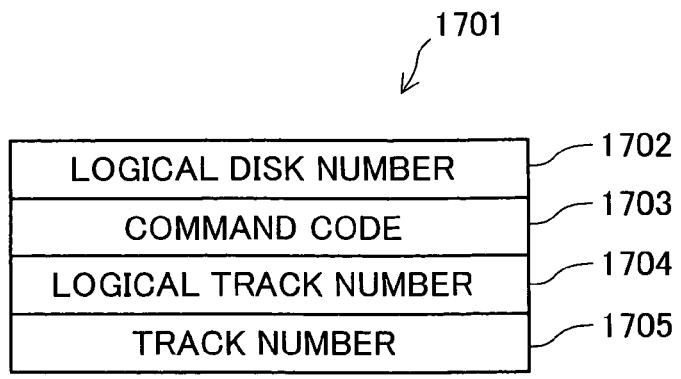
FIG. 17 shows the format of I/O commands issued by a host computer.

FIG. 17 shows the format of the disk I/O commands issued by the host computers 100. The disk I/O command 1701 comprises a logical disk number 1702 comprising the I/O target, a command code 1703 that expresses the I/O command in terms of a numerical value, a logical track number 1704 indicating the logical track to be accessed, and a number of tracks 1704 that expresses in terms of the number of tracks the data size of the data to be input or output. The control processor 104 extracts the logical disk number 1702. The control processor 104 specifies the RAID group number corresponding to the above logical disk number with reference to the logical disk control table 112 (step 701).

Next, the control processor 104 extracts the target logical track number contained in the received I/O command. The control processor 104 specifies the RAID group track number corresponding to the above logical track number from the RAID group number and the start track number in the logical disk control table 112 (step 702).

Specifically, the control program refers to the logical disk number entries 400 in FIG. 4 and specifies the corresponding RAID group. The track number in the RAID group corresponding to the numerical value of the entry in the logical track number 402 is stored as the entry in the start track number 403. As a result, the control program 109 can determine the track number in the RAID group corresponding to the logical track number comprising the target of the command.

The control processor 104 specifies the physical disk track number based on a preset rule regarding the allocation of track numbers within the RAID groups stored in the storage system and the RAID group track number specified in step 702. This track number allocation rule is control rule that operates to allocate a track number on a physical disk compatible with the RAID level. For example, in RAID-5 level, physical disk track numbers are associated with RAID group track numbers according to a rule called striping. Specifically, the RAID group track number 0x00000000 is associated with the track number 0x00000000 of the physical disk 0x00000000, and the RAID group track number 0x00000001 is assigned to the track number 0x00000000 of the physical disk 0x00000001. However, the above rule may naturally be modified appropriately based on the RAID level.

The control processor 104 accesses the physical disk track determined according to the above discussion (step 704). Here, 'access' refers to the reading or writing of data to or from the physical disk.

In this way, the control processor 104 converts the track number to be accessed between the logical disk and the physical disk and executes the I/O command.

Figure 8:
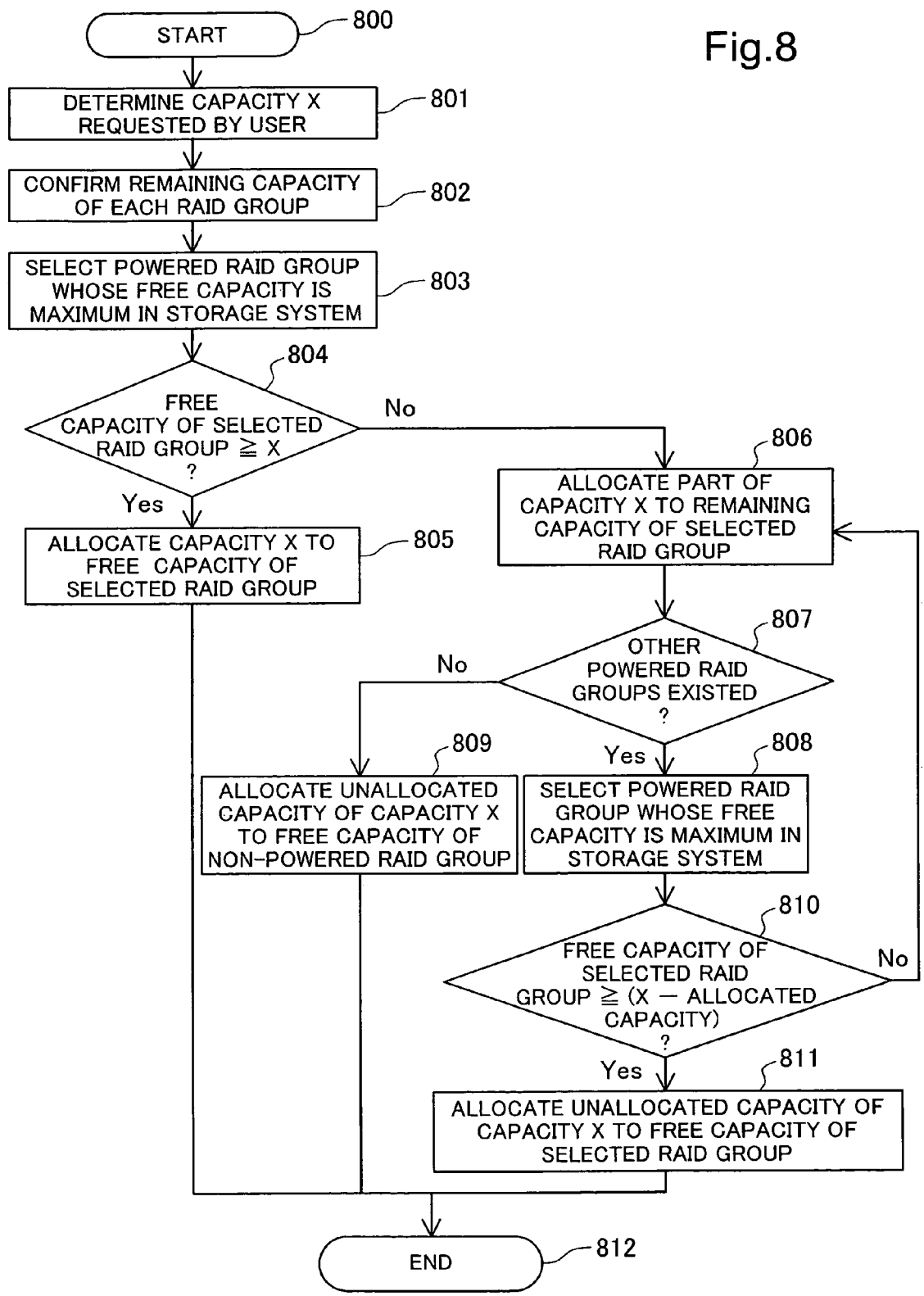
FIG. 8 is a flow chart showing the processing executed when capacity is added to the storage system 101.

FIG. 8 is a flow chart showing the processing performed during generation of a logical disk where a user request to increase the capacity of an existing logical disk has been issued. According to this flow chart, because when increasing the capacity of a logical disk the control processor 104 gives priority in the allocation of tracks to unallocated tracks in a powered RAID group and enables the use of these tracks, the increase in power consumption of the storage system as a whole can be minimized.

The flow chart described below is implemented via execution of a control program by the control processor 104.

First, the user operates the control terminal 102 and inputs a requested capacity X comprising the amount of increase in logical disk capacity (step 801). The control processor 104 receives this requested capacity from the control terminal 102.

Next, the control processor 104 checks the free capacity of each RAID group with reference to the RAID group control table 10 (step 802), and selects the RAID group having the largest free capacity among the powered RAID groups (step 803).

The control processor 104 then compares the requested capacity X and the free capacity of the selected RAID group (step 804). If the free capacity is larger than X, the control processor 104 proceeds to step 805. If the free capacity is smaller than X, the control processor 104 advances to step 806.

In step 805, the control processor 104 extracts tracks corresponding to the logical disk capacity X from the selected RAID group and creates a new logical disk. Here, when the above tracks are extracted, it is necessary to know the start track numbers of the unused (unallocated) tracks in the powered-state RAID groups; the used tracks in each RAID group can be learned by referring to the RAID group control table 110. Specifically, the number obtained by adding the value of the entry in the total capacity 203 to the value of the entry in the start track number 202 is the maximum possible value for the used track number. Therefore, the value obtained by adding 1 to this value is recognized as the start track number for the unused area.

In step 806, all of the unused tracks in the selected powered RAID group are allocated to the logical disk.

The control processor 104 then checks, with reference to the RAID group control table 110, whether powered RAID groups other than the selected RAID group exist or not (step 807). If powered RAID groups other than the selected RAID group do exist, the powered RAID group having the largest free capacity is selected (step 808).

If the free capacity of the powered RAID group selected in step 808 is larger than the capacity X minus the capacity already allocated (step 810), a prescribed number of tracks are allocated from the unused tracks in the selected RAID group to the logical disk (step 811).

If the free capacity of the RAID group selected in step 808 is smaller than the capacity X minus the capacity already allocated, the control processor 104 returns to step 806 and the operations of steps 809 to 811 are repeated until all of the requested capacity X is allocated.

If a powered RAID group other than the selected RAID group does not exist, tracks having a capacity equal to 'X minus the capacity allocated in step 806' are extracted from a non-powered RAID group and allocated to the logical disk (step 809). The method for selecting from among the non-powered RAID groups a RAID group from which the tracks are to be extracted will now be described with reference to FIG. 9.

Figure 9:
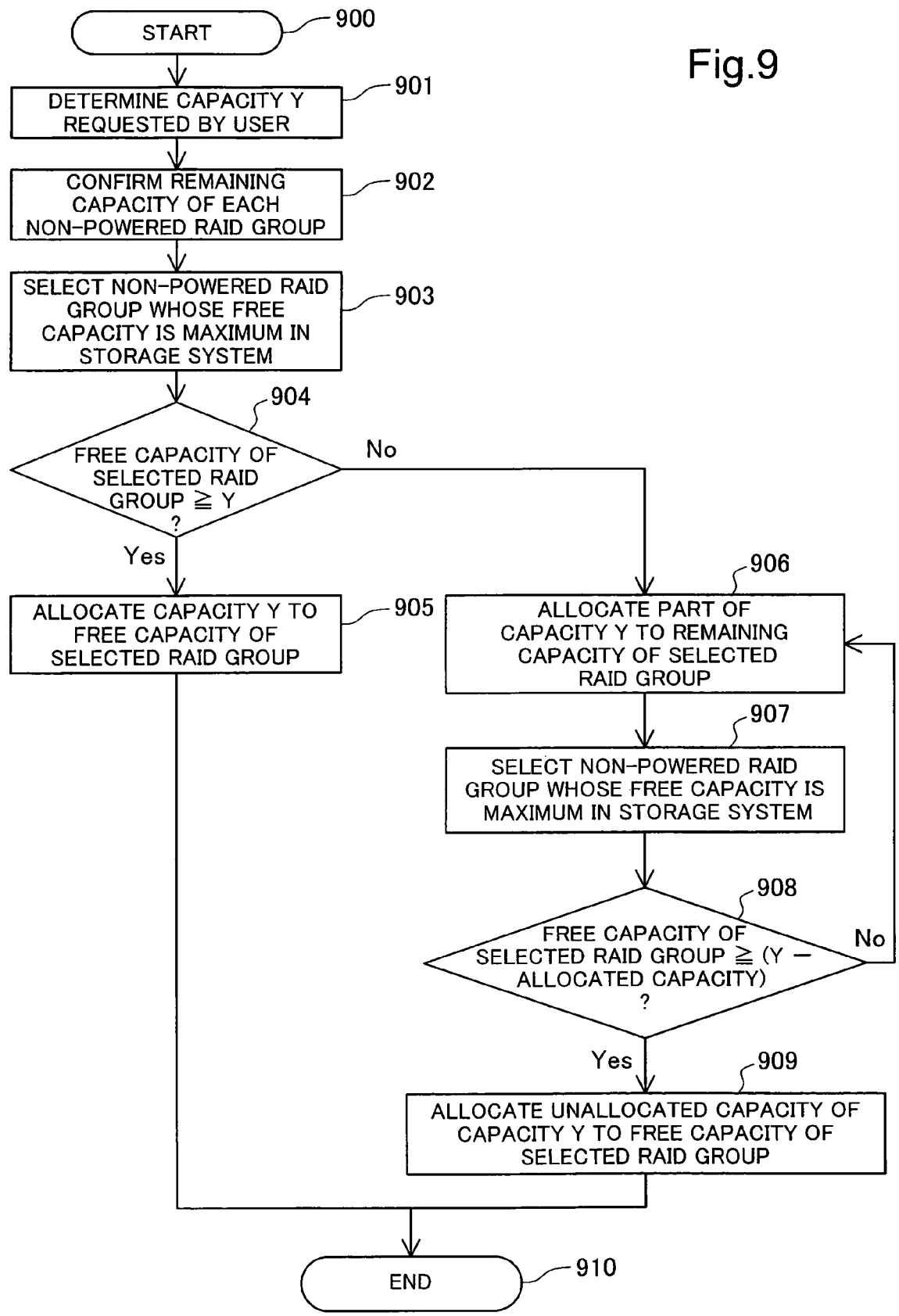
FIG. 9 is a flow chart showing the processing executed when a newly added track is selected from among the non-powered physical disks on the storage system 101.

FIG. 9 shows a detailed flow chart of step 809. In this processing, the storage system 101 supplies power to a non-powered RAID group, enabling the previously non-powered RAID group to be used by the host computer 100.

First, the capacity Y to be allocated from a non-powered RAID group to the logical disk is established by the control processor 104. Y is an amount calculated in step 804 by subtracting the free capacity of the selected RAID group from the capacity X (step 901).

The control processor 104 then checks the free capacity of each non-powered RAID group with reference to the RAID group control table 110 (step 902) and selects the RAID group having the largest free capacity from among the non-powered RAID groups (step 903).

The free capacity Y is then compared with the free capacity of the RAID group selected in step 903 (step 904). If the free capacity of the selected RAID group is larger than Y, the control processor 104 proceeds to step 905. If the free capacity of the selected RAID group is smaller than Y, the control processor 104 advances to step 906.

In step 905, the tracks of the selected RAID group are allocated to the logical disk.

In step 906, all of the free capacity of the selected RAID group is allocated to the logical disk. The RAID group having the largest free capacity is then selected from among the non-powered RAID groups (step 907).

The control processor 104 then compares the free capacity of the selected RAID group with the capacity obtained by subtracting the already allocated capacity from Y. If the free capacity of the selected RAID group is larger, the control processor 104 advances to step 909. If the free capacity of the selected RAID group is smaller, the control processor 104 proceeds to step 908.

In step 909, the free capacity of the RAID group selected in step 907 is allocated to the logical disk.

According to the flow chart of FIG. 9, priority in track allocation to the logical disk is given to the non-powered RAID group(s) having the largest free capacity. This enables the storage system 101 to restrict the number of powered RAID groups, i.e., the number of powered hard disk drives 106, in use to the smallest possible number. As a result, the increase in power consumed by the storage system 101 can be minimized.

Incidentally, the flow chart of FIG. 8 describes a process in which the control processor 104 selects the RAID groups having the largest free capacity from among the powered RAID groups and then allocates them to the logical disk in the order of the size of their free capacities. However, where a plurality of powered RAID groups exists, the number of powered RAID groups does hot change regardless of the sequence in which the free capacities of the powered RAID groups are allocated to the logical disk.

Therefore, in this case, it does not matter which RAID groups are selected. The processing in this case can be executed by modifying the processing carried out in steps 803 and 808 in FIG. 8 from selecting the largest free-capacity RAID group to selecting any RAID group from among the plurality of RAID groups having free capacity.

Figure 10:
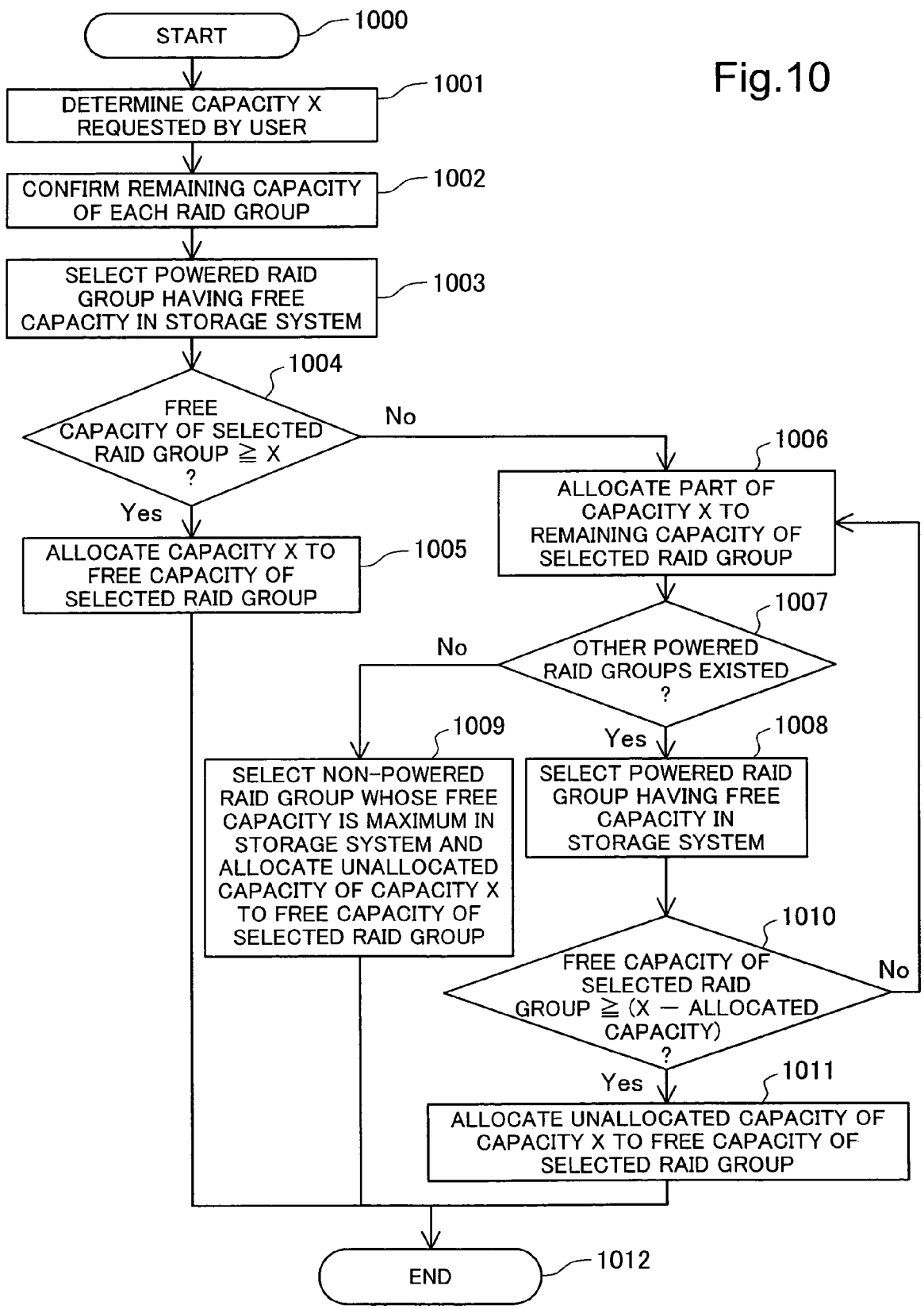
FIG. 10 is a flow chart showing the processing executed when capacity is added to the storage system 101.

The flow chart of the processing executed in this case is shown in FIG. 10.

First, the user operates the control terminal 102 and inputs the requested capacity X comprising the logical disk storage amount to be newly created (step 1001). The control processor 104 receives this requested capacity from the control terminal 102.

The control processor 104 then checks the free capacity of each RAID group with reference to the RAID group control table 110 (step 1002) and selects from among the powered RAID groups a RAID group that does not have a free capacity of '0' (step 1003). In does not matter how this RAID group is selected during this RAID group selection. In this embodiment, the RAID group having the smallest RAID group number is selected.

The control processor 104 then compares the free capacity of the selected RAID group with the requested capacity X (step 1004). If the free capacity is larger than X, the control processor 104 proceeds to step 1005. If the free capacity is smaller than X, the control processor 104 advances to step 1006.

In step 1005, the tracks corresponding to the logical disk capacity amount X are extracted from the selected RAID group and a new logical disk is created.

In step 1006, all of the unused tracks in the selected powered RAID group are allocated to this logical disk.

The control processor 104 then checks, with reference to the RAID group control table 110 (step 1007), whether or not one or more powered RAID groups other than the selected RAID group exist.

If one or more different powered RAID groups exist, a RAID group whose free capacity is not '0' is selected from among the powered RAID groups (step 1008).

If the free capacity of the powered RAID group selected in step 1008 is larger than the capacity obtained by subtracting the already allocated capacity from the capacity X (step 1010), a prescribed number of tracks is allocated to the logical disk from the unused tracks belonging to the selected RAID group (step 1011).

If the free capacity of the RAID group selected in step 1008 is smaller than the capacity obtained by subtracting the already allocated capacity from the capacity X, the control processor 104 returns to step 1006 and repeats the operations up to and including step 1009 or step 1011 until all of the requested capacity X is allocated.

If any powered RAID group does not exist, the number of tracks equivalent to the capacity calculated as 'X minus the capacity allocated in step 1006' is extracted from a non-powered RAID group and allocated to the logical disk (step 1009). In this case, the RAID group having the largest free capacity is selected from among the non-powered RAID groups.

Where the control processor 104 is to allocate capacity to the logical disk from a powered RAID group, any RAID group may be selected from among the powered RAID groups. However, where the control processor 104 is to allocate capacity to the logical disk from a non-powered RAID group, priority in selection must be given to the RAID group having the largest free capacity. Otherwise, the increase in power consumption cannot be minimized.

Figure 11:
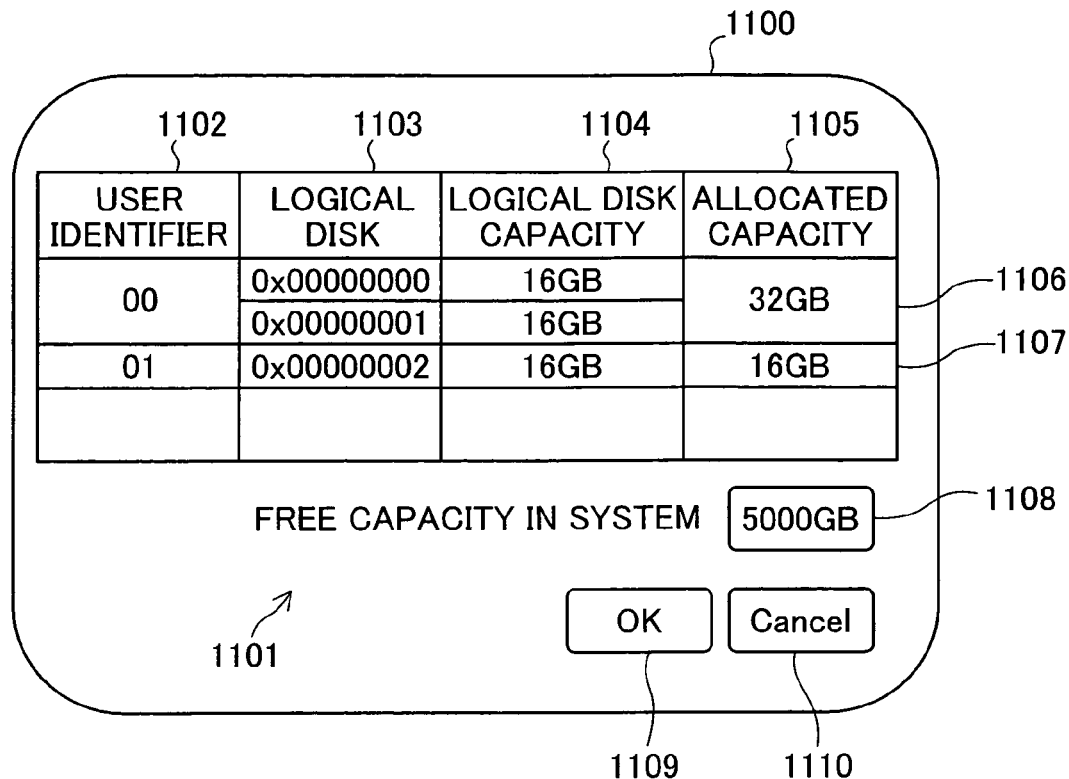
FIG. 11 is a simplified drawing of the screen of the management terminal of the storage system 101.

FIG. 11 is a schematic drawing of the screen of the control terminal 102 that is operated by the administrator of the storage system 101 to allocate capacity. The screen 1100 is the screen of the control terminal. The user control screen 1101 is displayed on the screen 1100. The user identifier column 1102 is a column in which user identifiers are displayed and entered. Here, the same information contained in the user identifier column 500 of the user control table 113 is entered and displayed. The logical disk column 113 is a column in which the logical disk number(s) allocated to each user are displayed and entered. Here, the same information contained in the logical disk number column 501 of the user management table 113 is entered and displayed. The logical disk capacity column 1104 is a column in which the capacity of each logical disk is displayed and entered. Here, the same information contained in the capacity column 502 of the user management table 113 is entered and displayed. The allocated capacity column 1105 is a column in which the total capacity of the logical disks allocated to each user is displayed. Here, the same information contained in the total capacity column 503 of the user management table 113 is displayed. The columns 1106, 1107 contain information regarding each user. The system free capacity window 1108 displays the usable free capacity available on the installed hard disk drives 106. A logical disk cannot be created if the resulting capacity would exceed the capacity of the installed hard disk drives 106. As a result, the control terminal 102 displays the system free capacity to the user to prevent the user from making configuration settings that cannot be implemented. The administrator can allocate capacity to each user using the control terminal shown in FIG. 11.

Second Embodiment

In the first embodiment, it is assumed that when a logical disk is allocated to a user, the user starts off using the total capacity of that logical disk. In other words, it is assumed that the physical disk(s) corresponding to the logical disk allocated to the user are powered.

However, it does not necessarily mean that the user who is allocated a logical disk immediately begin using the entire capacity of the physical disk(s) corresponding to the allocated logical disk. It is expected that actual usage will resemble the situation shown in FIG. 12.

Figure 12:
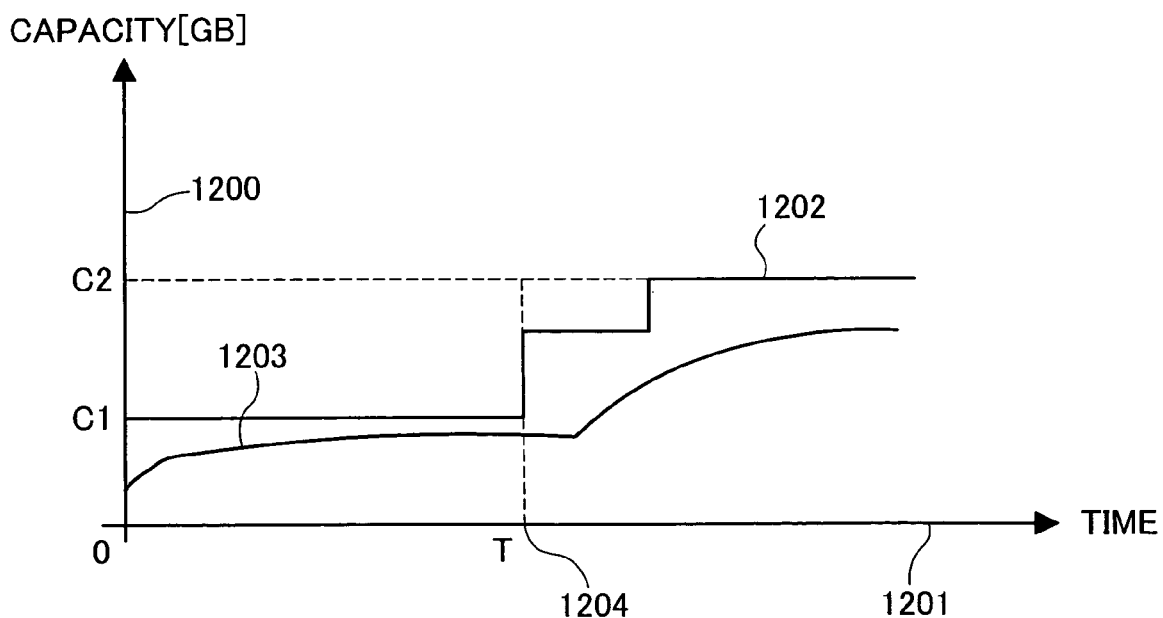
FIG. 12 is a graph showing the changes in used capacity of the storage system 101 overtime.

FIG. 12 shows the changes in the capacity of the storage system used by the user over time. The vertical axis 1200 represents the storage capacity used by the user, while the horizontal axis 1201 represents time. The stepped line 1202 in FIG. 12 represents the capacity of the logical disk allocated to the user. The curved line 1203 represents, out of the total capacity allocated to the user, the actually used capacity on the physical disk(s) on which data is actually stored.

In FIG. 12, the user initially uses approximately half of the capacity C1, but the data used gradually increases such that by time T1204, almost all of the capacity C1 is being used. Accordingly, the usable capacity is increased at time T1204 (at the point where the curved line crosses the broken line) to a usable capacity of C2.

In this case, a method may be envisioned in which not all of the usable capacity C2 is allocated to the user as a logical disk, but instead the usable capacity is increased incrementally in accordance with the status of use by the user.

According to the above method, the amount of the physical disk capacity necessary is used, and because fewer physical disks are necessary to create the logical disk, the number of physical disks that receive power can be minimized. This concept is described below with reference to the drawings.

Figure 13:
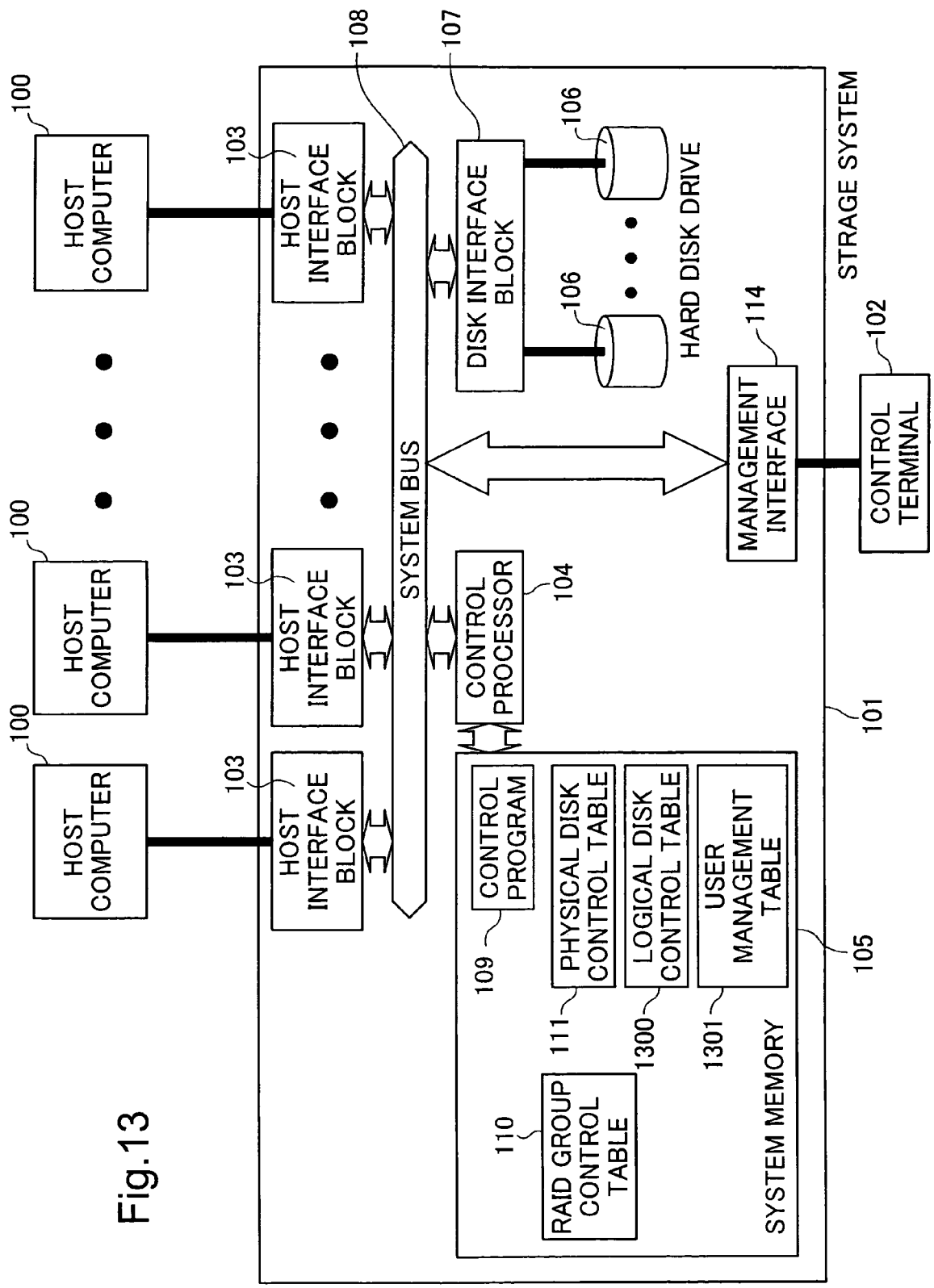
FIG. 13 is a block diagram showing the hardware configuration of a computer system of an embodiment.

FIG. 13 is a block diagram showing the functional internal configuration of the storage system 101. In the computer system of the second embodiment, allocation of physical storage areas in response to logical disk modifications is carried out incrementally in accordance with the amount of logical storage space used by each host computer 100. The computer system of the second embodiment is identical to the computer system of the first embodiment except that the contents of the logical disk control table 1300 and user management table 1301 differ from the contents of the equivalent tables in the first embodiment.

FIG. 14 is an explanatory drawing showing the logical disk control table 1300 of the second embodiment. The logical disk control table 1300 has the same format as the logical disk control table 112 of the first embodiment except that a 'number of allocated tracks' column 1406 is added. The 'number of allocated tracks' column 1406 is a column in which the control processor 104 registers the number of physical tracks actually allocated to a usable logical disk. This information is needed to enable the control processor 104 to detect the actual used capacity of the logical disk of a user and allocate physical tracks accordingly instead of immediately allocating the number of physical tracks corresponding to the capacity of the logical disk requested by the user. When the user issues a logical disk capacity allocation request, he or she believes that the logical disk capacity recorded in the total capacity column 1404 is usable. However, in actuality, because sufficient data to fill the capacity recorded in the total capacity column is not stored, the control processor 104 does not allocate the number of physical tracks corresponding to the capacity in the total capacity column. In other words, by controlling the allocated capacity of physical tracks in accordance with the actual status of use, the user does not perceive that there is insufficient storage capacity, and therefore does not observe any difference between his requested logical disk capacity and the actually allocated physical disk capacity.

For example, in the example of row 1407, 0x00002000 tracks from the start track 0x00000000 of the RAID group 0x00000000 are allocated to the logical tracks 0x00000000 to 0x00001FFF on the logical disk.

From FIG. 14 as a whole, it can be seen that the logical tracks beyond 0x00002800 are not allocated. There is no particular limitation regarding logical track numbers when tracks on a physical disk (here, a RAID group) are allocated.

FIG. 15 shows an example of the user management table 1301 of the second embodiment.

In the user management table 1301, as information pertaining to the allocation of logical disks to users of host computers 100, in addition to the information stored in the user management table 113 of the first embodiment, an allocated storage capacity column 1504 that indicates the physical disk storage capacity that has already been allocated to each logical disk is added.

For example, in the example of row 1507 of the user management table 1301 of FIG. 15, the logical disk 0x00000002 allocated to the user 0x0001 is recognized by a host computer 100 as a logical disk having a 16 GB storage capacity, and the tracks actually allocated to the logical disk 0x00000002 comprise physical tracks equivalent to 4 GB of storage capacity.

Furthermore, the substantially allocated capacity column 1504 is a column that corresponds to the number of allocated tracks column 1406 in the logical disk control table 1300, and expresses the capacity in units of bytes.

Figure 16:
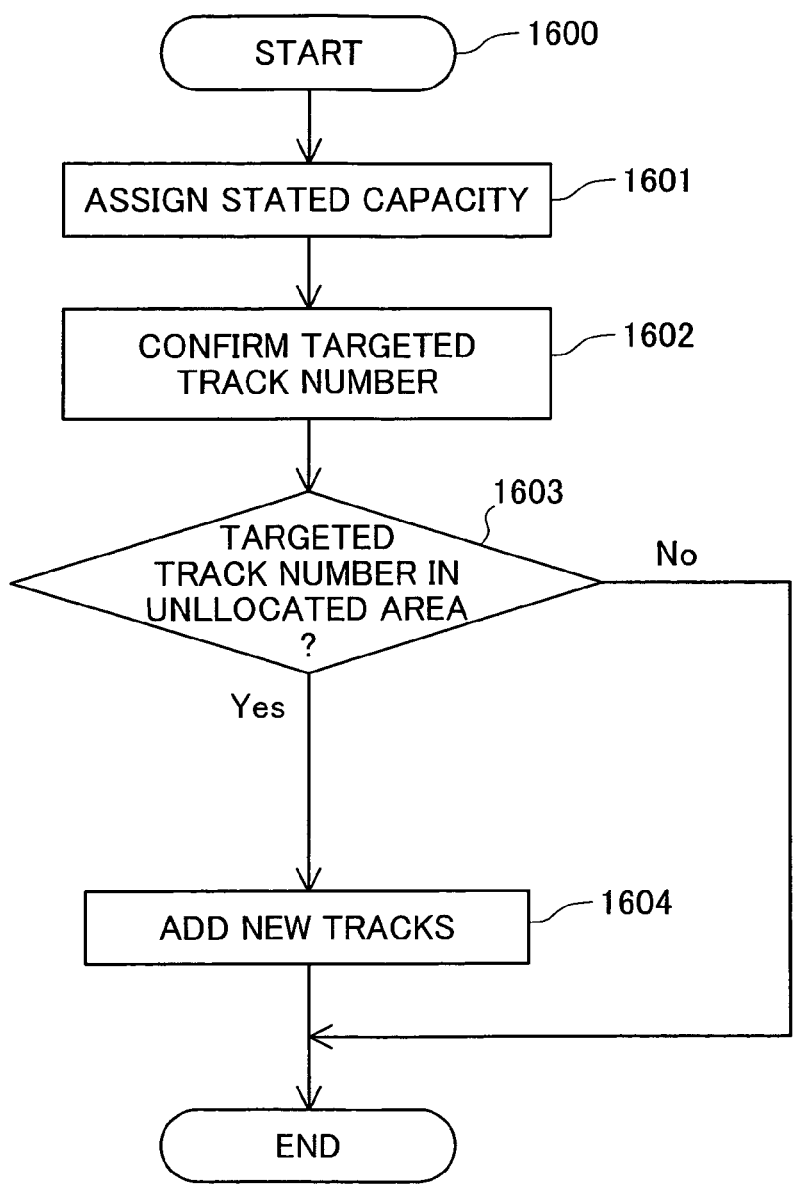
FIG. 16 is a flow chart showing the process executed to add capacity to the storage system 101.

FIG. 16 shows a flow chart indicating the processing by which the capacity of a user's logical disk is increased in accordance with the status of use thereof.

First, the control processor 104 creates a logical disk in response to the user's allocation request. Here, a logical disk having a capacity equivalent to the user's requested capacity is not created, but rather a logical disk having a fixed capacity is created (step 1601). This fixed capacity can be freely set by the administrator or user or set as a prescribed default value. There is no limitation regarding the logical track numbers to be allocated. The numerical values in the logical disk control table 1300 and the user management table 1301 are set in response to the numerical value set in this step.

The control processor 104 then extracts track numbers from the received write command (step 1602) and determines whether or not these track numbers are track numbers that have been actually allocated to the logical disk, i.e., whether or not they fall within the range from the start track number 1403 through the number of allocated tracks 1406 in the logical disk control table (step 1603). If they do fall within this range, the processing to increase the capacity of the logical disk is ended.

If the extracted track numbers do not fall within the above range, the control processor 104 proceeds to step 1604.

In step 1604, the control processor 104 allocates to the logical disk the tracks comprising the increase in the capacity of logical disk and writes the write command data to these allocated tracks. Here, while the control processor 104 executes processing to allocate the additional tracks to the logical disk, the amount of capacity additionally allocated can be set appropriately in accordance with the running of the storage system.

As described above, if tracks on a physical disk are allocated to a logical disk only to the extent of actual data writing by the user, the number of powered physical disks can be limited to the smallest possible number, thereby enabling the increase in power consumption resulting from such allocation to be minimized. The user does not notice that the capacity of the allocated logical disk is in fact less than the requested capacity. Furthermore, the storage system 101 ensures that the user can use the entire capacity requested by the user.

While the invention was described using embodiments above, the invention is not limited in any way by these embodiments, and may naturally be implemented in various forms within the essential scope thereof. For example, in the embodiments, the hard disks 510 were associated with logical disks via a RAID group based on RAID technology, but the hard disks may be associated with logical disks directly without employing RAID technology. Furthermore, in the second embodiment, where the plurality of hard disks include disks having different access speeds, the model of the hard disk to be associated with a logical disk may be selected in accordance with the use status of the logical disk.

The invention is not limited to the form of a storage system, and may be applied using various other forms, such as the form of a program that implements on the computer of a storage system a function to store information handled by a host computer, or the form of a disk control method by which to manage disks belonging to a storage system.

What is claimed is:

1. A storage system comprising:
   a plurality of drive devices that drive a plurality of physical disks each having a physical storage area;
   a RAID configuration unit that configures a plurality of RAID groups by grouping two or more of the plurality of physical disks;
   a logical disk creation unit that creates a logical disk on a given RAID group the logical disk having a logical storage area associated with the physical storage area of the given RAID group;
   a memory for storing a RAID group control table showing, for each RAID group, a power status of said each RAID group;
   wherein the storage system receives a request for creating a new logical disk,
   wherein the storage system preferentially selects a certain RAID group which is in a powered state from among the plurality of RAID groups based on the RAID group control table,
   wherein the storage system allocates some of the physical storage area of the certain RAID group to the new logical disk, and
   wherein when the storage system receives a write request for the new logical disk, the storage system stores data associated with the write request on the physical storage area that is allocated to the new logical disks,
   wherein a primary RAID group having a largest free capacity in the powered state is selected as the certain RAID group, wherein when the largest free capacity is larger than a requested capacity of the new logical disk, the entire physical storage area of the selected primary RAID group is allocated to the new logical disk.

2. The storage system according to claim 1, wherein, when the largest free capacity is smaller than a requested capacity of the new logical disk, a secondary RAID group having a free capacity in the powered state is selected, wherein the physical storage area of the secondary RAID group is allocated to the new logical disk in addition to the primary RAID group.

3. The storage system according to claim 1, wherein, when the free capacity of the certain RAID group is inadequate for the new logical disk, an alternate RAID group having a free capacity in the non-powered state is selected, wherein the physical storage area thereof is allocated to the new logical disk.

4. The storage system according to claim 1, wherein, when the free capacity of the certain RAID group is inadequate for the new logical disk, an alternate RAID group having the largest free capacity in the non-powered state is selected, wherein the physical storage area thereof is allocated to the new logical disk.

5. The storage system according to claim 1, wherein a primary RAID group having a free capacity in the powered state is selected as the certain RAID group.

6. The storage system according to claim 5, wherein, when the free capacity of the primary RAID group is smaller than a requested capacity of the new logical disk, a secondary RAID group, different from the primary RAID group, having a free capacity in the powered state is selected, wherein the physical storage area thereof is allocated to the new logical disk in addition to the primary RAID group.

7. The storage system according to claim 6, wherein, when the free capacity of the RAID group in the powered state is inadequate for the new logical disk, a tertiary RAID group having a largest free capacity in the non-powered state is selected, wherein the physical storage area thereof is allocated to the new logical disk.

8. The storage system according to claim 1, the storage system further comprising a power switching unit that switches power supply to the plurality of drive devices by the RAID group between the powered and non-powered state.

9. The storage system according to claim 1, wherein the area allocation unit comprises a allocation part that incrementally allocates the physical storage area of the certain RAID group to the new logical disk in accordance with usage of the new logical disk by the terminal.

10. The storage system according to claim 1, wherein the new logical disk is associated with tracks on physical disks which correspond to the physical storage area of the certain RAID group.

11. A storage system comprising:
    a plurality of drive devices that drive a plurality of physical disks each having a physical storage area;
    a RAID configuration unit that configures a plurality of RAID groups by grouping two or more of the plurality of physical disks;
    a logical disk creation unit that creates a logical disk on a given RAID group the logical disk having a logical storage area associated with the physical storage area of the given RAID group;
    a memory for storing a RAID group control table showing, for each RAID group, a power status of said each RAID group;
    wherein the storage system receives a request for creating a new logical disk,
    wherein the storage system preferentially selects a certain RAID group which is in a powered state from among the plurality of RAID groups based on the RAID group control table,
    wherein the storage system allocates some of the physical storage area of the certain RAID group to the new logical disk, and
    wherein when the storage system receives a write request for the new logical disk, the storage system stores data associated with the write request on the physical storage area that is allocated to the new logical disk,
    wherein a primary RAID group having a largest free capacity in the powered state is selected as the certain RAID group,
    wherein, when the largest free capacity is smaller than a requested capacity of the new logical disk, a secondary RAID group having a large free capacity in the powered state next to the primary RAID group is allocated to the new logical disk in addition to the primary RAID group.

12. A storage system comprising:

a plurality of drive devices that respectively drive a plurality of physical disks each having a physical storage area;

a RAID configuration unit that configures a plurality of RAID groups by grouping two or more of the plurality of physical disks;

a logical disk creation unit that creates, for each of the RAID groups, a logical disk having a logical storage area associated with the physical storage area;

a memory for storing a RAID group control table showing, for each RAID group, (i) a free capacity that is the amount of physical storage area remaining in the RAID group to be able to be associated with the logical disk and (ii) a power status of the RAID group;

a receiver that receives a request for creating a new logical disk; and an area allocation unit that allocates to the new logical disk the physical storage area remaining in a selected RAID group which is selected by giving priority to a RAID group in a powered state over a RAID group in a non-powered state with reference to the RAID group control table, wherein the area allocation unit comprises a primary selection part that selects a primary RAID group having a largest free capacity in the powered state as the selected RAID group the physical storage area of which is allocated to the new logical disk, wherein the area allocation unit comprises a secondary selection part that selects, when the largest free capacity is smaller than a requested capacity of the new logical disk, a secondary RAID group having a large free capacity in the powered state the physical storage area of which is allocated to the new logical disk in addition to the primary RAID group.

* * * * *